Nov. 19, 1957  R. F. LOOMIS  2,813,640
UNLOADER

Filed April 18, 1956  4 Sheets-Sheet 1

INVENTOR
ROBERT F. LOOMIS

BY Pennie Edmonds Morton Barrows & Taylor
ATTORNEYS

Nov. 19, 1957  R. F. LOOMIS  2,813,640
UNLOADER
Filed April 18, 1956  4 Sheets-Sheet 3

INVENTOR
ROBERT F. LOOMIS
By Pennie Edmonds
Morton Barrows & Taylor
ATTORNEYS

Nov. 19, 1957 R. F. LOOMIS 2,813,640
UNLOADER
Filed April 18, 1956 4 Sheets-Sheet 4

INVENTOR
ROBERT F. LOOMIS

BY *Pennie Edmonds Morton Barrows & Taylor*

ATTORNEYS

United States Patent Office 2,813,640
Patented Nov. 19, 1957

2,813,640

UNLOADER

Robert F. Loomis, Allentown, Pa., assignor to Fuller Company

Application April 18, 1956, Serial No. 578,909

15 Claims. (Cl. 214—17)

This invention relates to the conveying of pulverulent and granular material, and more particularly to the unloading and transference of such material from and to bins of both portable and permanent structure.

The unloading of pulverulent solids from vehicle bins has, in the past, involved expensive and space consuming equipment of a massive or fixed nature, or both. Such equipment has been in the form of elevated sidings or sunken pits with gravity, mechanical, or pneumatic conveyors. However, in many cases it has been impossible or impractical for plants to utilize the advantages of bulk delivery because of remoteness of sidings or loading areas, limitations in immediate space, or only marginal savings by reason of the capital expenditure required.

In cases in which plants are adjacent proper sidings, vacuum conveyors have been commonly used as a more satisfactory method of unloading. These conveyors use large volumes of air, and an airstream of high air-to-material ratio. High volumes of air require large blowers, and high air-to-material ratios require large, multiple air-material separators.

In cases wherein pressure-type pneumatic conveyors have been used, efficiency, in view of time and labor, has required each vehicle to carry at least a major part of its own conveying system. Pressure-type feeders of the size considered are heavy and require the efforts of several men to install and remove them from service on a vehicle. Furthermore, vehicles such as railway cars lack sufficient ground clearance to accommodate pressure-type line chargers.

Pressure-type pneumatic conveyors, since they use a lower air-to-material ratio in their airstreams, require much less than vacuum conveyors in power, air supply, and air-material separators. Where vacuum systems require multiple separators of the cyclone and filter cloth type, pressure-type conveyors require only stocking vents, or the like.

This invention provides an unloader which uses a relatively dense stream pressure-type conveying in a manner which allows the unloading of material from low clearance—as well as high clearance—vehicles and storage bins. It may be used to unload from vehicles into storage bins or other vehicles, and for selective unloading and conveying between stationary bins.

In cases wherein several bins are located in a low-clearance building, it has generally been necessary to provide an individual unloader for each bin. The unloader of this invention may be used to serve several such bins, both in loading them from vehicles or other bins, and in discharging them to use. Where this is possible, the invention can eliminate the cost of the several unloaders of the conventional type which heretofore were necessary.

The unloading of bulk transport vehicles for carrying pulverulent and granular solids has been further complicated, in a great many instances, by the tendency of the vehicles to change position during their unloading.

The suspension means of a vehicle, typically springs, are designed to operate most effectively under conditions of maximum loading. Therefore, when the state of loading or fullness of the bin is varied, there is a tendency for the suspension means to seek an equilibrium between the applied force or weight of the loading, and the innate forces of the means themselves. Thus a given point on a vehicle will be at one elevation, with respect to the ground or similar reference point, under conditions of full load, and at a different elevation from the reference point when the vehicle is empty. Obviously, under intermediate loading conditions, intermediate elevations will be reached, according to the peculiar characteristics of the suspension means such as age, condition of repair, and original and contemporary strength or power. The resultant motion of the vehicle in an upward direction is unimportant in cases of gravity discharge to pits, but tends to separate the vehicle from any applied unloading unit, since such unloading unit is not acted upon by the vehicular suspension system.

In the past, this problem has been countered by rigid fastening of the unloading means to the vehicle, making it, temporarily, an integral part of the vehicle. Since the mass of the unloader is essentially joined with the mass of the vehicle by rigid suspension from the vehicle, both are then acted upon by the vehicular suspension means in a manner which does not affect the seal or connection between them. However, in the practice of rigid interconnection, it has been found more practical to design the unloading means as an integral, permanent, component of the vehicle, by reason of the time and labor expended in installation and removal of the unloader at the time of each use. The structural requirements of both the vehicle and the unloading means are less in the case of permanent association than when heavy flanges, braces and clamps are provided for removable unloading means; however, this provision of an individual unloading means, particularly of the highly desirable pneumatic type, increases the cost of each vehicle, as well as detracts from the legal carrying capacity and the economy of transportation of many forms of vehicles because of the increased height of the center of gravity, and the added weight imposed, which additional weight is of value only when the vehicle has reached its destination.

This invention contemplates an unloader of the portable type which may be positioned under a bin, particularly a resiliently-supported bin, and has its inlet sealed to the outlet of the bin for receiving pulverulent material from the bin. It embodies a self-adjusting or compensating means of interconnection between itself and the bin, whereby, regardless of the elevation of the bin with respect to the ground or other support for the unloader, because of the extent of the unloading of the bin, a tight connection will be maintained between the bin outlet and the unloader inlet. To this end, the means for supporting the unloader from the ground or other surface is self-adjusting relative to the loader inlet, and means are provided for automatically and continually adjusting the position of the unloader and its inlet relative to its supporting means if the vertical position of the bin outlet rises due to a decrease of the weight of the material in the bin.

More particularly, the invention contemplates an unloader having a support connected through suitable linkage to fluid jacks and means for causing the fluid jacks to raise the unloader and its inlet relative to its support in such manner as to constantly exert a force on the unloader in a direction tending to force the inlet thereof upwardly into sealing engagement with the bin outlet as the elevation of the bin outlet relative to the ground or other supporting surface increases due to a decrease of the weight of the material therein during the unloading of the bin.

The invention will be further described in connection with the accompanying drawings in which:

Fig. 4 is an end view of the unloader as shown in Fig. 2;

Figure 1:
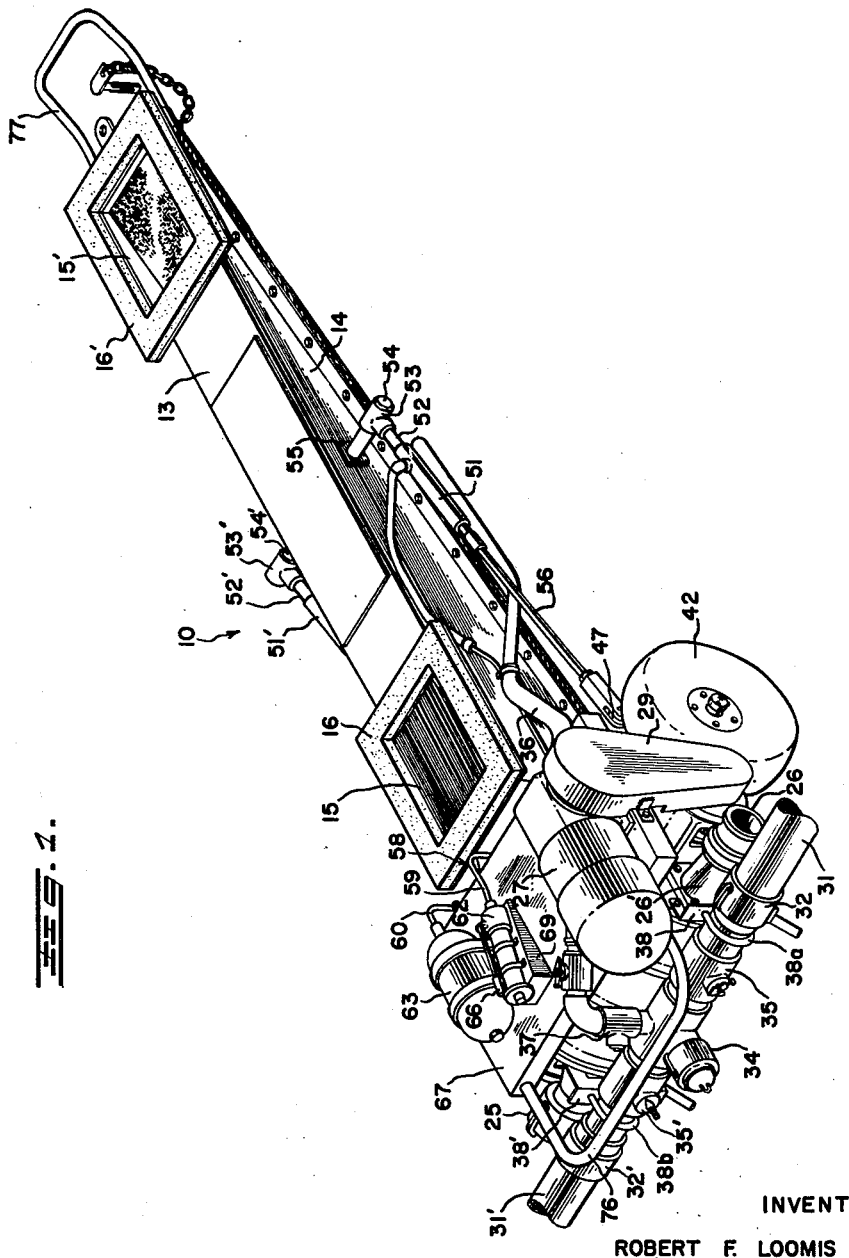
Fig. 1 is a perspective view of the unloader of the invention.
Figure 2:
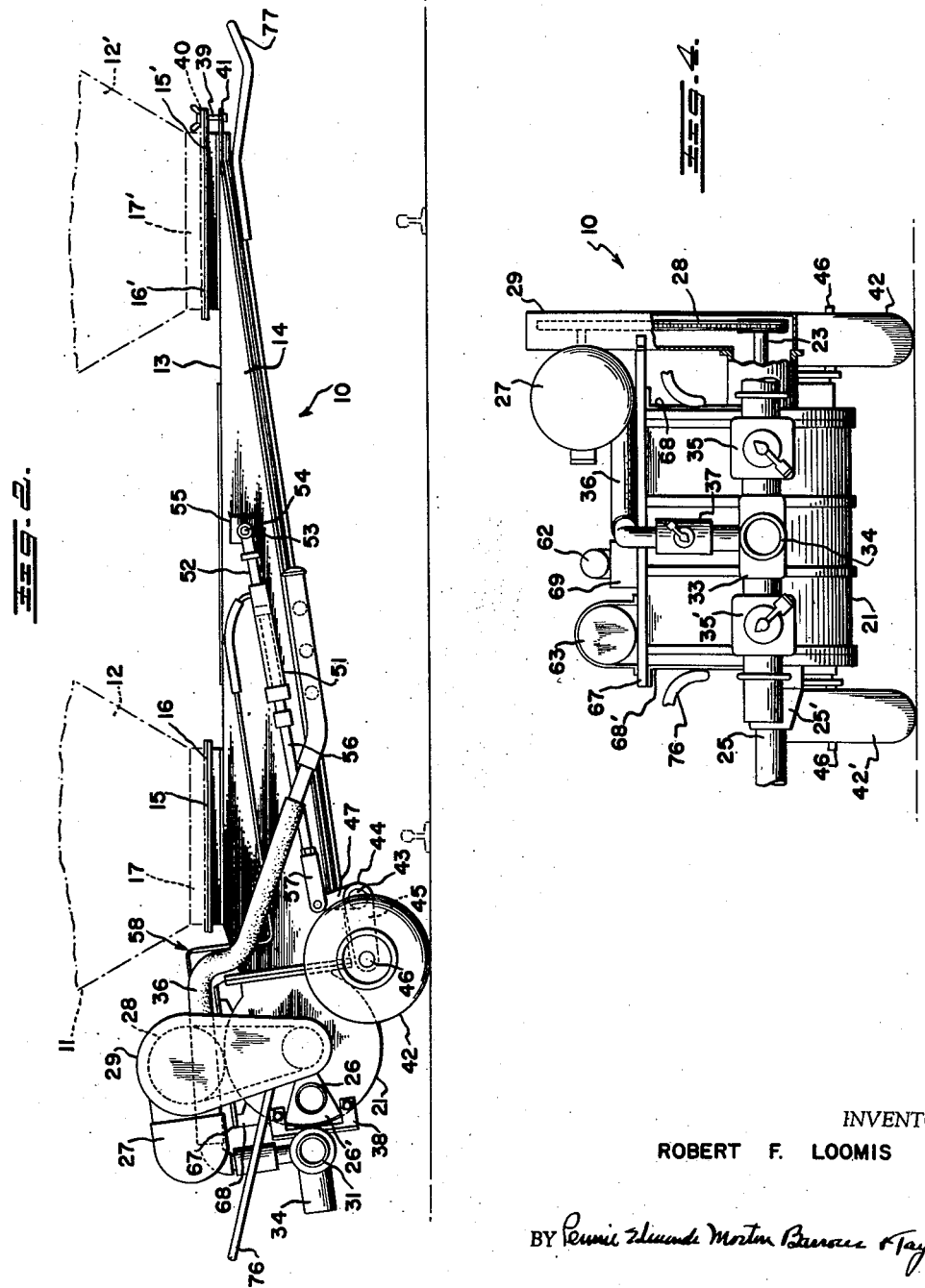
Fig. 2 is a side elevational view of the unloader shown in unloading position relative to a hopper-type railroad car.

Referring now to the drawings and particularly to Figs. 1 and 2, it will be noted that the unloader 10 is shown positioned beneath a conventional spring-suspended railroad car 11 of the hopper type having material-discharging hoppers 21 and 12'.

The unloader comprises a material-receiving casing 13 provided with spaced flanges 14 and 14' which surround identical inlet openings 15 and 15'. Resilient sealing gaskets 16 and 16' are cemented to the upper surface of the flanges and are adapted to be brought into sealing engagement with the lower edges of the hoppers 12 and and 12' so that pulverulent material in the car may flow through gates 17 and 17' in the bottom of the hoppers and into the material-receiving casing 13.

The bottom of the casing 13 is provided with suitable means for conveying material in the casing longitudinally to suitable means for feeding the pulverulent material to a receiving receptacle. The means for conveying the material longitudinally of the material-receiving casing may be of any type, but preferably is of the air-activated gravity-flow type shown in the patent to Schemm No. 2,527,455, and comprises a lower casing 19 forming a plenum chamber and a gas-permeable cover 20 therefor through which air introduced into the plenum chamber passes into and areates the overlying pulverulent material. The plenum chamber and its gas-permeable material-conveying cover 20 are of the same width as the material-receiving casing and are bolted to the bottom thereof but, if desired, the side walls of the casing may diverge upwardly from the sides of the gas-permeable medium. The air-activated gravity conveyor is inclined downwardly towards the material-feeding means and air introduced into the plenum chamber 19 passes upwardly through the gas-permeable medium 20 and aerates the overlying pulverulent material so that it will flow downwardly along the upper surface of the medium 20 to the material-feeding means.

The means for receiving the pulverulent material from the lower end of the air-activated gravity conveyor comprises a rotary feeder preferably similar to the type disclosed in the patent to Weller No. 2,681,748, and comprises a casing 21 having a rotor 22 mounted therein. The rotor is non-rotatably secured to a shaft 23 and is provided with a plurality of open-ended peripheral pockets 24 which receive the material discharged from the lower end of the conveying surface 20 of the air-activated gravity conveyor.

Te end plates of the feeder casing 21 are provided with aligned openings to which air-intake and material-discharge pipes 25 and 26, respectively, are connected. The feeder is driven from a motor 27 through a power train including chain-and-sprocket gearing 28 connecting the motor shaft with the feeder shaft 23. For safety precautions this gearing is covered by a guard 29.

Figure 5:
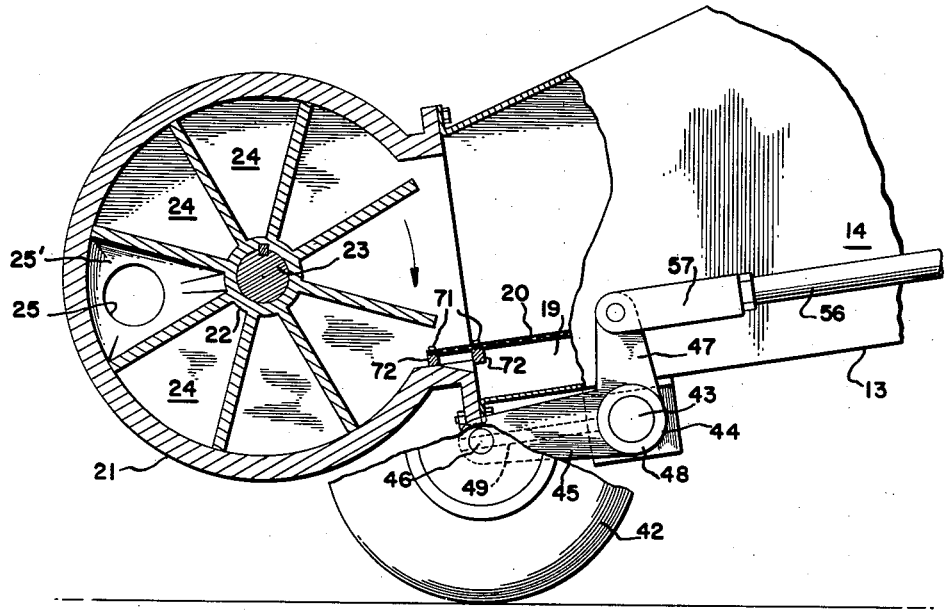
Fig. 5 is a sectional view showing the manner of feeding the material to a rotary feeder and the linkage for raising the unloader relative to its support.

As shown in Fig. 5, the material-receiving casing 13 opens directly into the rotor chamber. The rotor rotates in a clockwise direction and as the respective pockets successively come opposite the open end of the material-receiving chamber the aerated material flows into and fills them. Further rotation of the filled pockets brings them into alignment with the air-intake and material-discharge pipes 25 and 26 so that air from the intake pipe sweeps axially through the pockets and blows the material therein through the discharge pipe 26 by which it is conveyed to the material-receiving receptacle. In order that the pockets may be swept clean of the aerated material, the air-intake and material-discharge pipes 25 and 26 are connected to the end plates of the rotor by means of transition pieces 25' and 26'. These pieces are cylindrical where they connect with the air-intake and material-discharge pipes but where they connect with the end plates of the feeder are of the shape of the pockets of the rotor. Thus, every portion of the pockets is completely swept by the air so that no material will remain in the corners of the pockets.

The hopper car 11 may be, for example, of the type shown in the Schemm Patent No. 2,589,968, which is provided with air-activated gravity conveyors at each side of the hoppers 12 and 12' to facilitate an even flow of the pulverulent material from the main body of the car into the hoppers. The plenum chambers of thes air-activated gravity conveyors are supplied with air through pipes 31 and 31', which in turn are coupled, through suitable couplings 32 and 32', to an air manifold 33 which receives air through the air inlet 34. The air manifold 33 is provided with valves 35 and 35' which control the flow of air through the pipes 31 and 31' to the air-activated gravity conveyors within the car. The air manifold 33 is also provided with an off-take pipe 36 which leads to and is connected with the plenum chamber 19 of the air activated gravity conveyor at the bottom of the material-receiving casing 13. The off-take from the air manifold 33 leading to the air line 36 is provided with a valve 37 by which the amount of air introduced into the plenum chamber 19 may be controlled. The air manifold is supported from the feeder casing by means of brackets 38 and 38' secured to the end plates thereof and U-bolts 38$^a$ and 38$^b$.

The unloader may be supported beneath the hopper car in unloading position at its right-hand end, as viewed in Fig. 2, in any conventional manner, for example, by means of a bolt and wing nut 39 which extend through the outer side of a flange 40 of the hopper 12' and a similar flange 41 attached to the material-receiving casing 13 of the unloader. The entire weight of the unloader is supported by the wheels 42 and 42'. Each of the wheels is attached to the bottom of the plenum chamber 19 through an axle 43 extending transversely of and secured to the bottom of the plenum chamber 19, and through a bell-crank lever 44 having a forwardly-extending arm 45 provided with a stub axle 46 extending therefrom on which the wheel is mounted for rotation. The bell-crank lever also has an upwardly-extending arm 47 to which suitable means are connected whereby the bell-crank lever may be swung about the axle 43 to relatively adjust the position of the material unloader relative to the supporting wheels.

Figure 3:
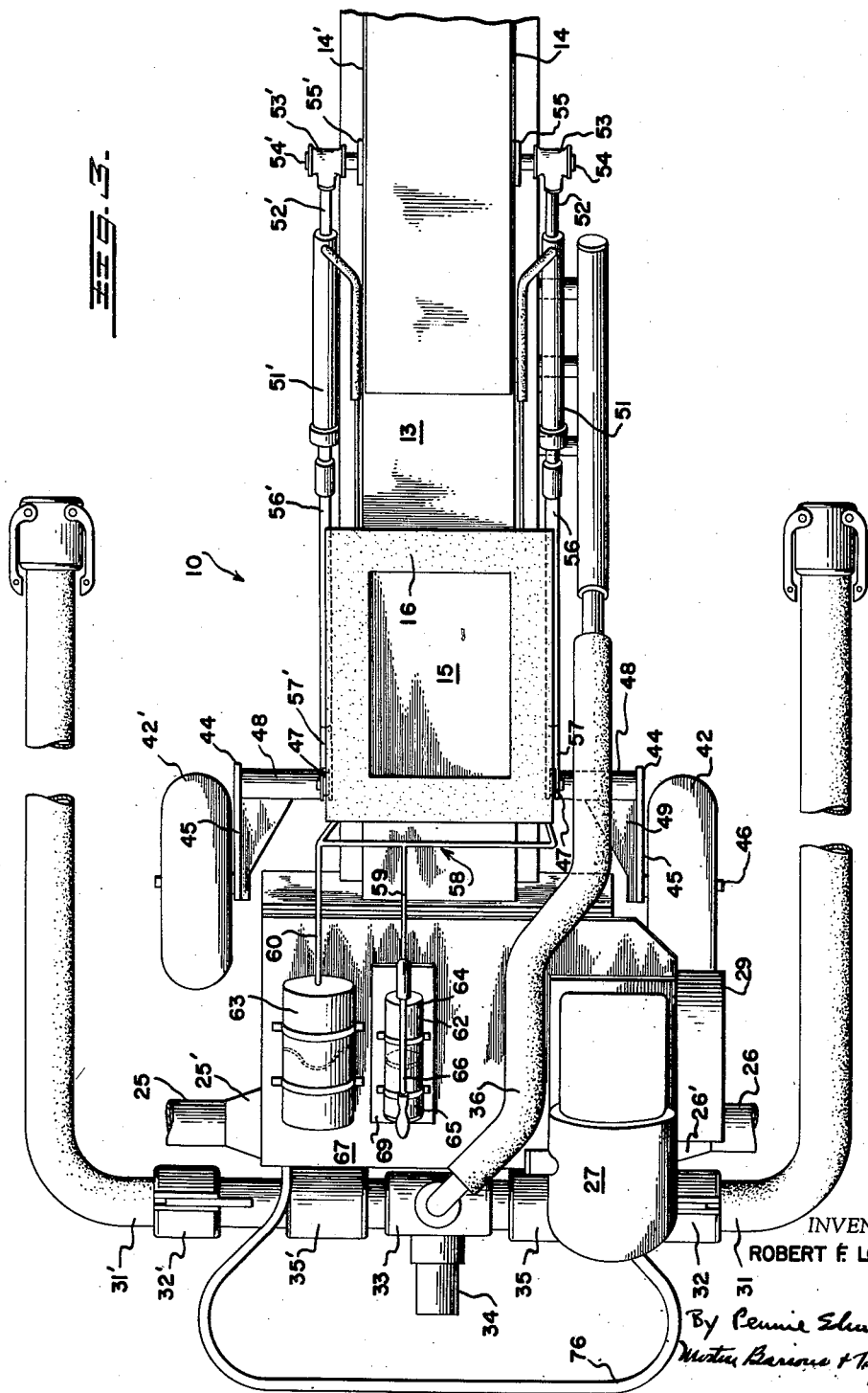
Fig. 3 is a plan view, on an enlarged scale, of the left-hand portion of the unloader shown in Figs. 1 and 2.

As shown in Figs. 2 and 3, each bell-crank lever 44 comprises a sleeve 48 which is rotatably mounted on the axle and has the arm 45 extending therefrom at one end and the lever 47 extending therefrom at the other end. Inasmuch as the bell-crank lever supports substantially the entire weight of the loader, it is provided with a reinforcing web 49 extending from the arm 45 to the sleeve 48.

The means for actuating the bell-crank lever 44 to cause relative vertical movement between the unloader and its supporting wheels is of the hydraulic type and comprises hydraulic jacks 51 and 51'. The cylinders of the hydraulic jacks are connected through supporting rods 52 and 52' to sleeves 53 and 53' rotatably mounted on stub axles 54 and 54' secured to the sides of the material-receiving casing 13 by means of brackets 55 and 55' welded thereto.

Each hydraulic jack is provided with the usual pistons, and the piston rods 56 and 56' which extend from the ends of the hydraulic jacks are connected at their outer ends to clevises 57 and 57' which, in turn, are connected to the upper ends of the arms 47 and 47' of the bell-crank lever. The clevises are adjustable relative to the piston rods 56 and 56' in order to properly level the unloader transversely relative to a horizontal plane surface.

The working cylinder of each of the hydraulic jacks 51 and 51' is connected with a piping system 58 for a suitable liquid such as oil. This piping system is connected by means of pipes 59 and 60, respectively, to a combined pump and reservoir unit 62 of conventional form, and to an accumulator 63, also of conventional form. The combined pump and reservoir unit 62 comprises a pump chamber 64 and a connected oil reservoir 65. The pump is actuated by the usual handle 66 and, upon actuation of the handle, oil from the reservoir 65 is pumped into the piping system, the hydraulic jacks 51 and 51' and eventually into the accumulator chamber 63. The pump preferably is actuated until the oil within the piping system and the connected hydraulic jacks and oil accumulator chamber is under a pressure equal to a predetermined charged pressure of the accumulator. The accumulator chamber includes a gas-filled inflatable bag which forms a diaphragm transversely of the chamber against which the pressure of the oil in the hydraulic system is exerted. At the pre-charged pressure, the end of the inflatable bag is deformed inwardly to a substantial extent by the introduced oil so that the pressure of the gas within the bag causes a substantially constant pressure to be maintained on the oil within the hydraulic system, tending to actuate the hydraulic jacks in a direction to swing the bell-crank lever 44 in a counterclockwise direction to cause relative upward movement of the unloader relative to its supporting wheels.

The motor 27, the pump and reservoir unit 62, and the accumulator chamber 63 are all mounted upon a supporting platform 67 supported from the rotary feeder casing 21 by means of brackets 68 and 68' secured to the end plates of the feeder casing. The combined pump and reservoir unit 62 is supported from this platform by a wedge-shaped member 69 which is inclined downwardly in the direction of the pump chamber of unit 62 so that the oil in the reservoir will flow by gravity into the pump chamber.

Instead of using the combined reservoir and pump unit actuated by a pump handle, and an accumulator chamber, as shown, a conventional gear pump actuated from the motor 27 and a pressure regulator to maintain the desired pressure in the hydraulic system may be used.

Figure 6:
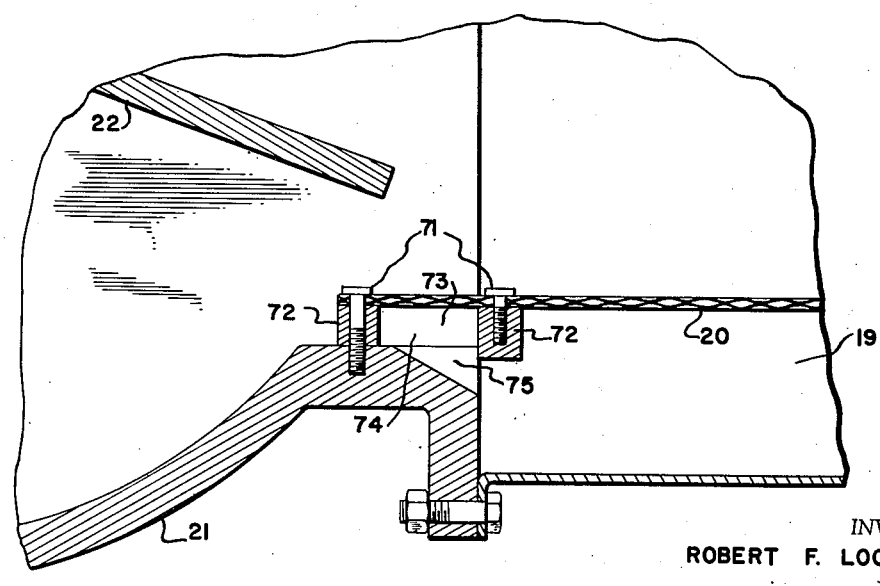
Fig. 6 is an enlarged detailed view of a portion of Fig. 5.

Special means are provided to insure a complete filling of the pockets 24 of the feeder rotor 21. As shown in Figs. 5 and 6, the lower end of the air-activated gravity conveyor is secured to the casing of the rotary feeder by bolts 71 passing through flanges on the feeder casing and on the plenum chamber 19. The gas-permeable material-conveying surface 20 which overlies and closes the upper side of the plenum chamber 19 is secured to suitable transverse supports 72, as shown in the foresaid Schemm patent, but in this instance it is extended beyond the end of the plenum chamber and into the material-receiving throat of the rotary feeder by means of side and end bars 73 which act to space the extended end of the gas-permeable medium from the bottom of the throat and to seal it at its sides and ends against escape of air. The space 74 between the extended end of the gas-permeable medium and the bottom of the receiving throat of the rotary feeder is in communication with the plenum chamber 19 by means of a gas passage 75 so that the air within the plenum chamber passes into the space 74 and from it upwardly through the extended end of the gas-permeable medium so that the material flowing downwardly along the gas-permeable medium is aerated up to the very instance in which it flows into the pockets 24 of the feeder rotor.

Referring to Fig. 5, it will be noted that the air trapped within the pockets 24, after the pulverulent material in them has been discharged by means of the air blast from the pipe 25, is discharged into the upper portion of the material-receiving casing 13 so that it does not interfere with the free flow of material along the material-conveying surface 21 into the pockets. The air thus discharged from the pockets as well as the air which passes upwardly through the gas-permeable medium 20 to aerate the pulverulent material passes upwardly through the hoppers of the car and eventually vents to the atmosphere from the upper portion of the car. Although such air passes countercurrent to the flow of material from the car into the material-receiving casing 13, the size of the inlet to the casing 13 is sufficiently large that it does not materially impede the flow of the material from the hoppers 12 and 12' into the casing.

To facilitate mobility of the unloader and its proper positioning beneath a car, it is provided at its ends with handles 76 and 77.

When it is desired to use the unloader for unloading pulverulent material from a hopper bottom car, it is moved into the position shown in Fig. 2 and the end adjacent the handle 77 may be attached to the hopper bottom 12' by means of the bolt and wing nut 39. The pump 64 is then actuated to put the hydraulic system under the predetermined charged pressure so that the deformation of the diaphragm of the accumulator chamber causes the desired pressure to be constantly maintained on the oil in the system. This causes the hydraulic jacks 51 and 51' to be actuated in a direction to swing the bell-crank levers 44 and 44' counterclockwise to cause relative movement of the unloader relative to the supporting wheels and a resulting elevating of the end of the unloader adjacent the hopper 12 until both the gaskets 16 and 16' are brought into tight sealing engagement with the lower end of the discharge outlets from the hoppers 12 and 12', respectively. The valve in one of the hoppers, say the valve 17 in hopper 12, is then opened to permit the pulverulent material in the adjacent side of the car to pass through the hopper 12 into the material-receiving casing 13. The rotary feeder is set in operation. Air is supplied to the plenum chamber 19 to aerate the pulverulent material within the casing 13. The valve 35 leading to pipe 31 is opened so that air is introduced into the plenum chamber at the side of the car adjacent hopper 12 to facilitate the flow of the pulverulent material from that side of the car to the hopper 12, and air is supplied to the air-inlet 25 leading to the rotary feeder. The unloader is now on line and will continue to operate until the material in the side of the car adjacent hopper 12' has been unloaded. At such time gate 17 and valve 35 may be closed and gate 17' and valve 35' will be opened to permit air from the air manifold to pass through the pipe 31' leading to the plenum chamber underlying the other side of the car. Aerated material from that side of the car then flows into the hopper 12' and is discharged, as aforesaid, until the car is completely unloaded. When desired, both valves 17 and 17' may be opened at the same time, and air supplied to all parts of the car at the same time, thus unloading both areas coincidently, or any other advantageous unloading sequence may be adopted by the operator.

As the unloading of the material from the car proceeds, the weight of the car exerted on its resilient suspension grandually becomes less and less, with the result that the force exerted by the springs raises the car. As the car is thus gradually raised, the force exerted by the gas pressure in the accumulator chamber on the oil in the hydraulic system causes the hydraulic jacks 51 and 51' to actuate the bell-crank levers in a direction to raise the unloader relative to its supporting wheels so that as the bottom of the hoppers 12 and 12' are raised with the car, the unloader and its sealing gaskets 16 and 16' are correspondingly raised so that a tight seal between the gaskets and the bottom of the car hoppers is constantly maintained until unloading of the car has been completed. After the car has been completely unloaded, the pressure in the hydraulic system is released by means of a convention relief valve in the pump-reservoir unit to permit oil in the hydraulic system to flow back into the reservoir. This results in a lowering of the unloader and its inlets relative to its supporting wheels. The bolt and wing nut 39 is then unfastened, the ends of pipes 31 and 31' disconnected from the car and the unloader removed.

While the invention has been particularly described in connection with hydraulic means for moving the unloader relative to its support in order to maintain a tight connection with the discharge ends of the hoppers, it is to be understood that pneumatic or other means might be used, if desired.

While the unloader of the present invention is particularly adapted for use in connection with the unloading of resiliently-supported railroad cars or other vehicles and the transfer of material in them to stationary or portable receiving receptacles, it is to be understood that, if desired, the unloader may also be used for the unloading of stationary bins or other receptacles in which case the hydraulic jacks will assure a tight seal being maintained between the discharge outlet of the receptacle and the inlet of the unloader.

Various changes may be made in the details of the unloader as described without sacrificing any of the advantages thereof or departing from the scope of the invention, as claimed.

I claim:

1. An unloader for receptacles comprising a material-receiving casing having an inlet opening in the upper side thereof for receiving material from the outlet of a receptacle, means for supporting the casing, means for moving the casing relative to said supporting means, and means for causing a force to be constantly exerted against said moving means in a direction to elevate the casing relative to the supporting means, whereby the casing may be positioned beneath a receptacle with the inlet opening thereof in registry with an outlet of the receptacle and the casing moved relative to the supporting means to make and to maintain a tight connection between the casing and the receptacle.

2. An unloader as defined in claim 1 in which the means for causing a force to be constantly exerted against said moving means includes fluid means.

3. An unloader as defined in claim 1 in which the means for moving the casing relative to the supporting means includes a fluid jack having a piston rod extending therefrom, means for introducing fluid into the working cylinder of the fluid jack, lever means connecting the piston rod with the supporting means for the casing and operable upon actuation of the fluid jack to cause such relative motion, an accumulator for maintaining a supply of fluid under pressure and conduit means connecting the fluid space of the accumulator with the working cylinder of the fluid jack, whereby a force may be constantly exerted on the piston rod of the fluid jack to cause relative movement between the casing and the supporting means therefor in a direction to elevate the casing.

4. An unloader as defined in claim 3 including a reservoir for fluid, a pump connected to said reservoir and said accumulator, whereby fluid from said reservoir may be pumped into the fluid space of the accumulator, the connection between the reservoir and the pump inclining downwardly towards the pump so that fluid from the reservoir will flow by gravity to the pump.

5. An unloader for receptacles comprising a material-receiving casing having an inlet opening in the upper side thereof for receiving material from the outlet of a receptacle, material-conveying means adjacent the lower side of the casing, a material feeder positioned to receive material from the conveyor and to discharge it to a transport line, means for supporting the casing and feeder, means for moving the casing and feeder relative to said supporting means, and means for causing a force to be constantly exerted against said moving means in a direction to elevate the casing and feeder relative to the supporting means, whereby the casing may be positioned beneath a receptacle with the inlet opening thereof in registry with an outlet of the receptacle and the casing moved relative to the supporting means to make and to maintain a tight connection between the casing and the receptacle.

6. An unloader as defined in claim 5 in which the means for causing a force to be constantly exerted against said moving means includes fluid means.

7. An unloader as defined in claim 5 in which the means for moving the casing relative to the supporting means includes a fluid jack having a piston rod extending therefrom, means for introducing fluid into the working cylinder of the fluid jack, lever means connecting the piston rod with the supporting means for the casing and operable upon actuation of the fluid jack to cause such relative motion, an accumulator for maintaining a supply of fluid under pressure and conduit means connecting the fluid space of the accumulator with the working cylinder of the fluid jack, whereby a force may be constantly exerted on the piston rod of the fluid jack to cause relative movement between the casing and the supporting means therefor in a direction to elevate the casing.

8. An unloader for receptacles comprising a material-receiving casing having an inlet opening in the upper side thereof for receiving material from the outlet of a receptacle, material-conveying means adjacent the lower side of the casing, a material feeder positioned to receive material from the conveyor and to discharge it to a transport line, means at one end of the casing for securing it to a receptacle to be unloaded, a pair of supports for the casing and feeder at the other end of the casing, one at each side of the casing, a bell-crank lever secured to the casing at each side thereof for pivotal movement with respect thereto, said supports being mounted, repectively, on one of the arms of the bell-crank levers, actuating means connected, respectively, to the other arms of the bell-crank levers for causing said levers to swing about their respective pivots, whereby upon operation of said actuating means the end of the casing adjacent which supports are secured may be caused to move upwardly relative to said supports to bring the upper side of the casing surrounding the inlet opening into tight engagement with a discharge outlet of a receptacle, and means for causing a force to be constantly exerted against said actuating means in a direction to maintain the upper side of the casing in tight engagement with said discharge outlet.

9. An unloader for receptacles comprising a material-receiving casing having an inlet opening in the upper side thereof for receiving material from the outlet of a receptacle, a gas-permeable member extending along the bottom of the casing, a plenum chamber beneath the gas-permeable member, means for introducing air into the plenum chamber for passage through the gas-permeable member to aerate material thereon to cause it to flow therealong, a material feeder positioned to receive material discharged from one end of the gas-permeable member and to discharge it to a transport line, means for supporting the casing and feeder, and means for moving the casing and feeder relative to said supporting means, whereby the casing may be positioned beneath a receptacle with the inlet opening thereof in registry with an outlet of the receptacle and the casing moved relative to the supporting means to make a tight connection between the casing and the receptacle.

10. An unloader as defined in claim 9 including means for causing a constant force to be exerted tending to move the casing relative to the supporting means therefor.

11. An unloader as defined in claim 9 including fluid means for causing a constant force to be exerted tending to move the casing relative to the supporting means therefor.

12. An unloader as defined in claim 9 having a manifold, an air inlet to said manifold, a conduit extending from the manifold to the plenum chamber, and at least one conduit extending from the manifold for supplying air to a plenum chamber of the receptacle.

13. An unloader as defined in claim 9 in which the material feeder includes a casing, a rotor within the casing having peripheral pockets and means whereby material in said pockets, upon reaching a predetermined position on rotation of the rotor, may be discharged, the casing has an opening in the side thereof for receiving material from the gas-permeable member, and the end of the gas-permeable member and the underlying plenum chamber terminate adjacent the opening in the casing.

14. An unloader for receptacles comprising a material-receiving casing having an inlet opening in the upper side thereof for receiving material from the outlet of a receptacle, a first gas-permeable member extending along the bottom of the material-receiving casing, a plenum chamber beneath the first gas-permeable member, means for introducing air into said plenum chamber for passage through said first gas-permeable member to aerate material thereon to cause it to flow therealong, a material feeder having a casing with an opening in one side of the periphery thereof adjacent one end of the first gas-permeable member, a rotor mounted for rotation in said casing, said rotor having peripheral pockets, a second gas-permeable member extending from said casing opening to adjacent the peripheral pockets of said rotor, a second plenum chamber beneath the second gas-permeable member, means for introducing air into said second plenum chamber for passage through said second gas-permeable member to aerate material thereon to cause it to flow therealong, and one end of the second gas-permeable member being adjacent one end of the first gas-permeable member whereby material may be delivered along the gas-permeable members through the opening in the casing and into the peripheral pockets in an aerated state.

15. Pulverulent material conveying and feeding means comprising a casing, a rotor mounted for rotation in said casing, said rotor having peripheral pockets, the casing having an opening in one side of the periphery thereof for the passage of material to be received in the pockets, means whereby material in said pockets, upon reaching a predetermined position on rotation of the rotor, may be discharged, a gas-permeable member, a plenum chamber beneath said gas-permeable member, means for introducing air into said plenum chamber to pass through the gas-permeable member to cause pulverulent material thereon to be aerated and to flow therealong, one end of the gas-permeable member and the plenum chamber terminating adjacent said peripheral pockets in the rotor whereby pulverulent material may be delivered through the opening in the casing onto the gas-permeable member and directly into the peripheral pockets in an aerated state.

References Cited in the file of this patent
UNITED STATES PATENTS
1,955,536    Cullen  ---------------- Apr. 17, 1934